United States Patent
Ikeda et al.

(10) Patent No.: US 10,400,497 B2
(45) Date of Patent: Sep. 3, 2019

(54) VEHICLE WINDOW GLASS RAISING/LOWERING DEVICE, VEHICLE DOOR, AND VEHICLE

(71) Applicant: MITSUBA CORPORATION, Gunma (JP)

(72) Inventors: Hiroyuki Ikeda, Nagano (JP); Hideaki Takehara, Nagano (JP); Yasuhiro Saito, Nagano (JP); Sadaji Umehara, Nagano (JP); Tsuyoshi Kondo, Nagano (JP); Masakane Yoshizawa, Nagano (JP); Hideaki Kashiwagi, Nagano (JP); Mayu Kobayashi, Nagano (JP)

(73) Assignee: MITSUBA CORPORATION, Gunma (JP)

( * ) Notice: Subject to any disclaimer, the term of this patent is extended or adjusted under 35 U.S.C. 154(b) by 5 days.

(21) Appl. No.: 15/558,219

(22) PCT Filed: Mar. 23, 2015

(86) PCT No.: PCT/JP2015/058756
§ 371 (c)(1),
(2) Date: Sep. 14, 2017

(87) PCT Pub. No.: WO2016/147417
PCT Pub. Date: Sep. 22, 2016

(65) Prior Publication Data
US 2018/0100342 A1     Apr. 12, 2018

(30) Foreign Application Priority Data

Mar. 16, 2015  (JP) .................................. 2015-052717

(51) Int. Cl.
*E05F 15/43*    (2015.01)
*B60J 1/00*     (2006.01)
(Continued)

(52) U.S. Cl.
CPC ............... *E05F 15/431* (2015.01); *B60J 1/00* (2013.01); *B60J 1/17* (2013.01); *E05F 15/43* (2015.01);
(Continued)

(58) Field of Classification Search
CPC .......................... E05F 15/431; E05F 2015/434
See application file for complete search history.

(56) References Cited

U.S. PATENT DOCUMENTS 6,344,642 B1 * 2/2002 Agam ..................... G01S 15/46
250/221
2002/0179822 A1   12/2002 Breed et al.
(Continued)

FOREIGN PATENT DOCUMENTS

CN         1713220 A1     12/2005
DE   10 2007 001 180 A1     7/2008
(Continued)

OTHER PUBLICATIONS

International Preliminary Report on Patentability and Written Opinion dated Sep. 28, 2017 issued in PCT/JP2015/058756.
(Continued)

*Primary Examiner* — Justin B Rephann
(74) *Attorney, Agent, or Firm* — Scully, Scott, Murphy & Presser, P.C.

(57) ABSTRACT

A vehicle window glass raising/lowering device includes a drive mechanism, a control unit for controlling the drive mechanism, and a camera for capturing an image of a detection line. The camera includes an optical system. The control unit includes a detection means for detecting a blocked state in which the detection line captured in an image by the camera is at least partially blocked by a foreign object, and a pinching prevention means when the blocked state is detected by the detection means during when the
(Continued)

window glass is moved by the drive mechanism. The optical system is arranged at a position corresponding to an opening formed on an inner circumferential surface of the frame portion so that an optical axis of the optical system passes through the opening.

11 Claims, 7 Drawing Sheets

(51) Int. Cl.
  *B60J 1/17* (2006.01)
  *E05F 15/73* (2015.01)
  *E05F 15/689* (2015.01)
(52) U.S. Cl.
  CPC ....... *E05F 15/73* (2015.01); *B60Y 2400/3015* (2013.01); *E05F 15/689* (2015.01); *E05F 2015/434* (2015.01); *E05F 2015/436* (2015.01); *E05F 2015/765* (2015.01); *E05F 2015/767* (2015.01); *E05Y 2800/00* (2013.01); *E05Y 2900/55* (2013.01)

(56) References Cited

U.S. PATENT DOCUMENTS

| | | | |
|---|---|---|---|
| 2005/0174079 A1* | 8/2005 | Mersch | B60J 7/0573 318/280 |
| 2005/0276449 A1 | 12/2005 | Pedemas et al. | |
| 2008/0074067 A1 | 3/2008 | Rhodes | |
| 2011/0295469 A1* | 12/2011 | Rafii | E05F 15/43 701/49 |
| 2014/0207344 A1* | 7/2014 | Ihlenburg | E05F 15/73 701/49 |
| 2017/0306684 A1* | 10/2017 | Baruco | E05F 15/43 |
| 2018/0044964 A1* | 2/2018 | Ikeda | B60J 1/00 |
| 2018/0328095 A1* | 11/2018 | Kobayashi | E05F 15/431 |

FOREIGN PATENT DOCUMENTS

| | | |
|---|---|---|
| JP | S60-126439 U | 8/1985 |
| JP | S60-133219 A | 9/1985 |
| JP | S62-40176 A | 3/1987 |
| JP | 2006-316562 A | 11/2006 |
| JP | 2007-186915 A | 7/2007 |
| JP | 2007-186916 A | 7/2007 |

OTHER PUBLICATIONS

International Search Report dated Jun. 9, 2015 issued in PCT/JP2015/058756.
Japanese Office Action dated Jun. 2, 2015 issued in JP 2015-052717.
Extended Supplementary European Search Report dated Oct. 16, 2018 in European Patent Application No. 15 88 5512.2.
First Office Action dated Aug. 28, 2018 received from the State Intellectual Property Office of the People's Republic of China in related application CN 201580077951.1.

\* cited by examiner

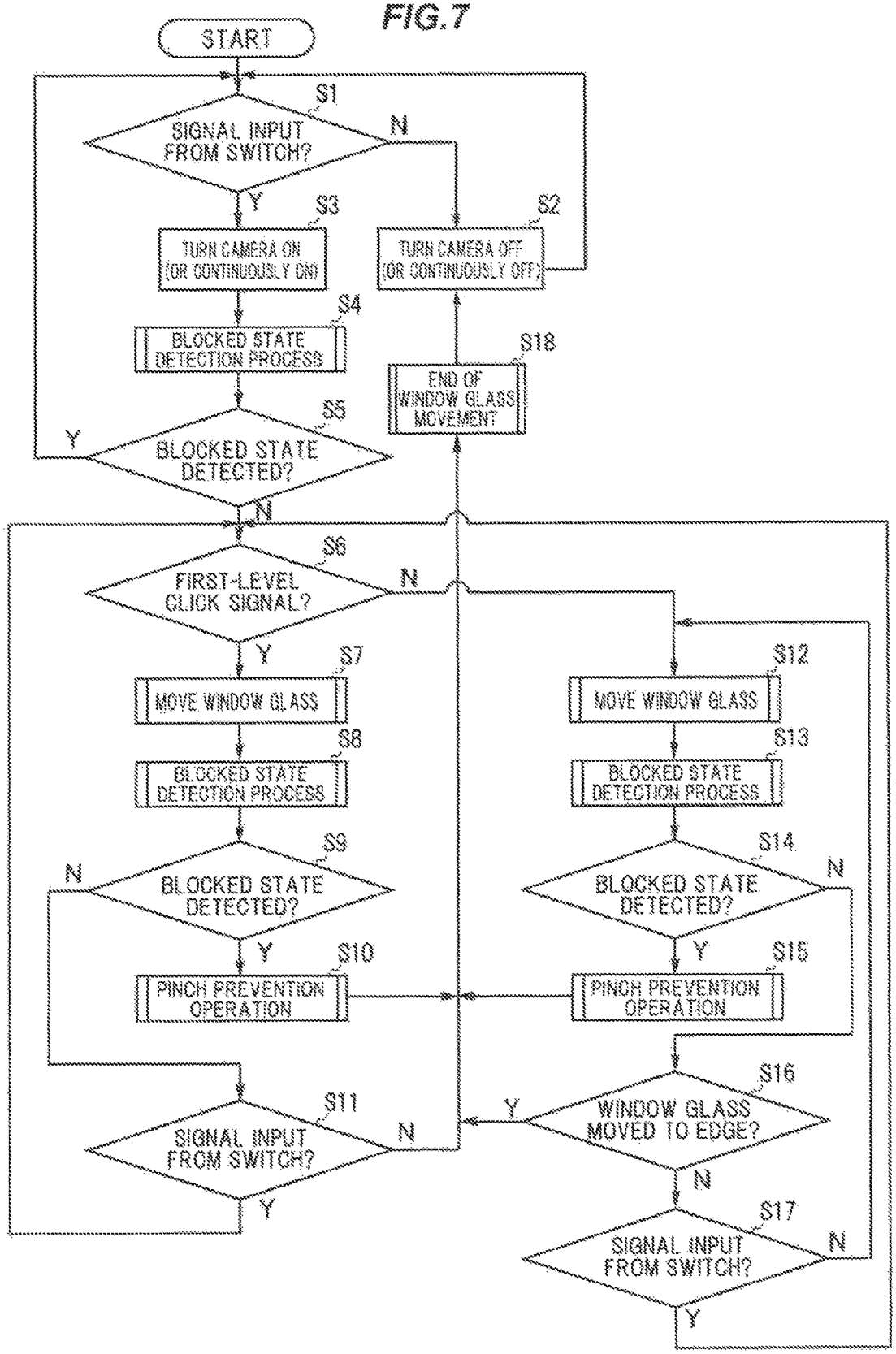

VEHICLE WINDOW GLASS RAISING/LOWERING DEVICE, VEHICLE DOOR, AND VEHICLE

TECHNICAL FIELD

The present invention relates to a vehicle window glass raising/lowering device, a vehicle door, and a vehicle.

BACKGROUND ART

In recent years, vehicle window glass raising/lowering devices for automatically raising or lowing window glasses are mounted on vehicles so that windows can be easily opened or closed.

Vehicles doors have a storage portion for housing a retracted window glass and a frame portion provided above the storage portion, and vehicle window glass raising/lowering devices are provided with a drive mechanism for moving a window glass vertically relative to the frame portion and a control unit for controlling the drive mechanism.

Since the window glasses are electrically raised or lowered, the vehicle window glass raising/lowering devices are generally provided with a mechanism to prevent pinching by window glass.

It is known that one of such mechanism is configured to monitor variation in rotational speed of a motor which drives a window glass, to determine that a foreign object is pinched by the window glass when a load increases and the rotational speed of the motor is reduced during raising the window glass, and to perform various safety operations such as automatic lowering of window glass by reversing its movement direction.

In such a mechanism, however, the safety operations are performed after a foreign object (part of human body, etc.) is actually caught. Therefore, a load is inevitably applied to human body and this causes a safety problem. For example, in case of a vehicle having window glasses of which upper edges are inclined obliquely downward at end portions in the front-back direction of the vehicle, and when a foreign object such as finger enters a wedge-shaped space between the window glass and the frame portion during when the window glass is moving up, a large load may be applied to a part of human body, etc., even when the safety operation is performed. Furthermore, in this mechanism, since a region of, e.g., 4 mm from the closing end for the window glass is often configured as an insensitive zone so that full closing of the window glass is not incorrectly detected as occurrence of pinching, the safety operation may not be performed when, e.g., a finger of a young child is trapped, hence, improvement is desired.

The vehicle window glass raising/lowering device disclosed in PTL 1 solved such problems.

In PTL 1, it is described that a camera is located on the vehicle interior side with respect to the window glass as well as on the lower-front side of the vehicle with respect to the window glass, a foreign object to be possibly pinched by the window glass is detected based on an image captured by the camera, and various safety operations such as automatic lowering of window glass is performed.

In PTL 1, it is also described that a marking applied around a window frame or an edge of the outline of the window frame, etc., is used as a feature amount for foreign object determination, and various safety operations are performed when a foreign object is present between the markers, etc., used as a feature amount and the camera.

The detection of the foreign object to be possibly pinched by the window glass based on the image captured by the camera as described in PTL 1 allows a safety operation to be performed before the object is pinched, and safety is thereby further improved.

CITATION LIST

Patent Literature

PTL 1: JP 2007/186915A1

SUMMARY OF INVENTION

Technical Problem

In the meantime, in PTL 1, a camera is located on the vehicle interior side with respect to the window frame (on the lower-front side of the vehicle with respect to the window glass) so as to cover the entire window frame, that is, an entire moving area of the window glass as a detection range. In PTL 1, the located position of the camera is necessary far from the window glass.

Therefore, in a region close to the camera, a part of the passenger's body is located between the camera and the marker, etc., even a passenger is present in a position where the passenger is normally not judged as the foreign object, depending on the position of the seat or the physical size of the passenger, and this causes a safety operation such as automatic lowering of window glass or halt of window glass movement to be performed during raising the window glass even though there is actually no possibility of getting pinched by the window glass. There is also a case where the window glass cannot be raised or lowered even though the raising/lowering operation is intended.

As described above, in PTL 1, in such a case, it is not possible to close or move the window even when a user wants to close or move the window in normal use. In view of convenience, improvement is desired.

It is an object of an embodiment of the invention to provide a vehicle window glass raising/lowering device that makes it possible to prevent pinching by the window glass without impairing convenience.

Solution to Problem

According to one embodiment, the invention provides a vehicle window glass raising/lowering device, comprising: a drive mechanism arranged on a vehicle door comprising a storage portion for housing a window glass and a frame portion provided above the storage portion to vertically move the window glass relative to the frame portion; a control unit for controlling the drive mechanism; and a camera for capturing an image of a detection line provided on a vehicle interior side with respect to the window glass, the detection line being along at least a portion of the frame portion and an upper surface of a door trim attached on a vehicle interior side of the storage portion, wherein the camera comprises an optical system including at least one lens and an image pickup device onto which a subject image is focused by the optical system, wherein the control unit comprises a detection means for detecting a blocked state in which the detection line captured in an image by the camera is at least partially blocked by a foreign object, and a pinching prevention means that causes the drive mechanism to perform a pinch prevention operation for preventing pinching by the window glass when the blocked state is detected by the detection means during when the window glass is moved by the drive mechanism, and wherein the optical system is arranged at a position corresponding to an opening formed on an inner circumferential surface of the frame portion so that an optical axis of the optical system passes through the opening and the door trim being attached on the vehicle interior side of the storage portion.

In this embodiment of the invention, it is configured that "the optical system is arranged at a position corresponding to an opening formed on an inner circumferential surface of the frame portion". In this configuration, it is possible to arrange the camera close to the window glass. As a result, it is possible to prevent such a problem that the pinch prevention operation is performed despite no risk of getting pinched by the window glass, hence, convenience can be improved. Furthermore, the entire moving area of the window glass can be the detection range by monitoring the detection line located on the frame portion and the upper surface of the door trim.

According to another embodiment, the invention also provides A vehicle door, comprising: a storage portion for housing a window glass; a frame portion provided above the storage portion; a drive mechanism that vertically moves the window glass relative to the frame portion; a control unit for controlling the drive mechanism; and a camera for capturing an image of a detection line provided on the vehicle interior side with respect to the window glass, the detection line being along at least a portion of the frame portion and an upper surface of a door trim attached on a vehicle interior side of the storage portion, wherein the camera comprises an optical system including at least one lens and an image pickup device onto which a subject image is focused by the optical system, wherein the control unit comprises a detection means for detecting a blocked state in which the detection line captured in an image by the camera is at least partially blocked by a foreign object, and a pinching prevention means that causes the drive mechanism to perform a pinch prevention operation for preventing pinching by the window glass when the blocked state is detected by the detection means during when the window glass is moved by the drive mechanism, and wherein the optical system is arranged at a position corresponding to the opening formed on an inner circumferential surface of the frame portion so that an optical axis of the optical system passes through the opening.

According to another embodiment, the invention also provides a vehicle comprising: the vehicle door described above.

Advantageous Effects of Invention

According to an embodiment of the invention, it is possible to provide a vehicle window glass raising/lowering device that makes it possible to prevent pinching by the window glass without impairing convenience.

BRIEF DESCRIPTION OF DRAWINGS

FIG. 7 is a flowchart showing a control flow of the vehicle window glass raising/lowering device.

DESCRIPTION OF EMBODIMENT

Embodiment

Figure 1:
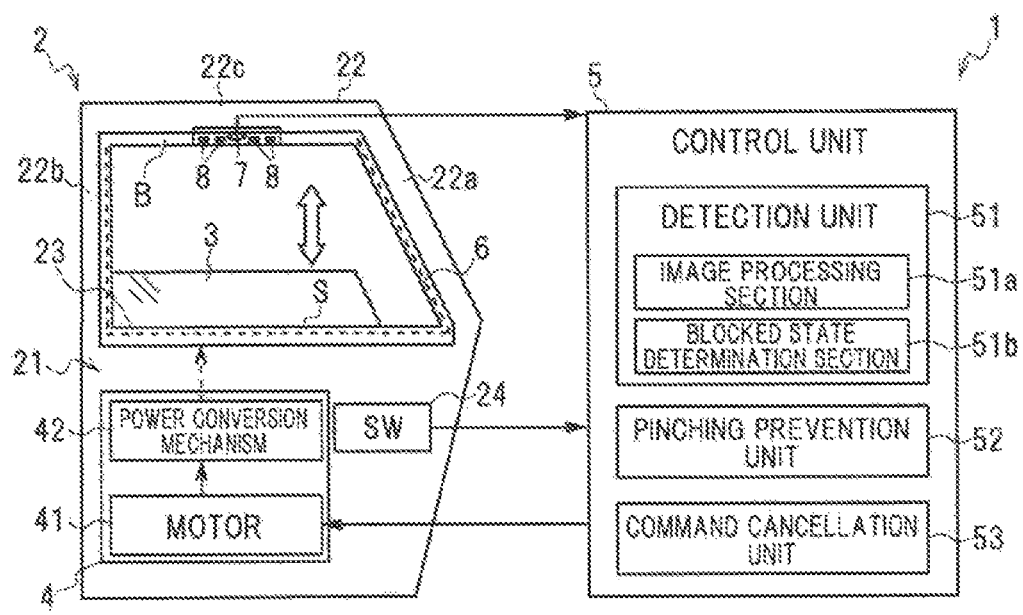
FIG. 1 is an explanatory diagram illustrating a vehicle window glass raising/lowering device in an embodiment of the present invention.

An embodiment of the invention will be described below in reference to the drawings FIG. 1 is an explanatory diagram illustrating a vehicle window glass raising/lowering device in the present embodiment.

As shown in FIG. 1, a door 2 of a vehicle (vehicle door) mounting a vehicle window glass raising/lowering device 1 has a storage portion 21 for housing a window glass 3 and a frame portion 22 provided above the storage portion 21. A door trim 23 is attached on the vehicle interior side of the storage portion 21 so as to cover the storage portion 21.

The frame portion 22 is composed of a rear upright portion 22a extending upwards from an end of the storage portion 21 on the rear side in the front-back direction of the vehicle, a front upright portion 22b extending upwards from the storage portion 21 on the front side with respect to the rear upright portion 22a, and an upper extended portion 22c extending from the top end of the rear upright portion 22a to the top end of the front upright portion 22b. When the window glass 3 is fully closed, the window glass 3 is positioned in a space surrounded by the frame portion 22 and the upper edge portion of the door trim 23.

The vehicle window glass raising/lowering device 1 is provided with a drive mechanism 4 for driving the window glass 3 and a control unit 5 for controlling the drive mechanism 4.

The drive mechanism 4 is to move the window glass 3 vertically relative to the frame portion 22, and is provided with a motor 41 such as DC motor and a power conversion mechanism 42 for converting a drive force of the motor 41 into power for vertically move the window glass 3. The power conversion mechanism 42 which can be used here is, e.g., a window regulator which is provided with a carrier plate supporting the window glass 3 and slidably moving along a guide rail and is configured to slidably move a wire along the guide rail by a drive force of the motor 41 and thereby to vertically move the carrier plate attached to the wire and the window glass 3 along the guide rail. An X-Arm type or another type of regulator can be also used as the power conversion mechanism 42.

A switch (SW) 24 is provided on the door 2 to open/close the window glass 3. An output signal line of the switch 24 is connected to the control unit 5. The switch 24 is constructed from, e.g., a two-stage click-type rocker switch which is configured to output a signal to the control unit 5, such that a first-level move-down click signal is output when an end on the move-down side is clicked to the first level, a second-level move-down click signal is output when the end on the move-down side is clicked to the second level, a first-level move-up click signal is output when the other end on the move-up side is clicked to the first level, and a second-level move-up click signal is output when the other end on the move-up side is clicked to the second level.

The control unit 5 controls the drive mechanism 4 according to the signal from the switch 24 to vertically move the window glass 3. The control unit 5, as a control unit constructed by appropriately combining CPU, memory, interface and software, etc., is mounted on the door 2. Other than on the door 2, the control unit 5 may alternatively be mounted as a part of, e.g., an electronic control unit (ECU) which controls mirrors or seats of the vehicle.

The control unit 5 is configured to control the drive mechanism 4 such that when a first-level move-down click signal is input from the switch 24, the window glass 3 is lowered during when the signal is being input, and when a second-level move-down click signal is input, the window glass 3 continues to move down until the window glass 3 reaches the bottom or the switch 24 is operated again. Also, the control unit 5 controls the drive mechanism 4 such that when a first-level move-up click signal is input from the switch 24, the window glass 3 is raised during when the signal is being input, and when a second-level move-up click signal is input, the window glass 3 continues to move up until the window glass 3 reaches the top or the switch 24 is operated again.

Next, a configuration to prevent pinching by the window glass 3 will be described.

The vehicle window glass raising/lowering device 1 is provided with a camera 7 which captures an image of a detection line 6. The detection line 6 is provided on the vehicle interior side with respect to the window glass 3 and is at least partially along the frame portion 22 and the door trim 23. In the present embodiment, whether or not a foreign object to be possibly pinched by the window glass 3 is present is judged based on an image captured by the camera 7. A specific configuration and installed position of the camera 7 will be described later.

The detection line 6 is a reference line for judging the existence of a foreign object to be possibly pinched by the window glass 3, and is provided on the vehicle interior side with respect to the window glass 3. A specific configuration and setting position of the detection line 6 will be described later.

In the present embodiment, light sources 8 emitting infrared radiation toward the detection line 6 are also provided. The camera 7 is constructed from an infrared camera which captures the infrared radiation emitted from the light sources 8 and reflected by the detection line 6. Since the light sources 8 are provided, a foreign object to be possibly pinched can be detected also during the night, or in a dark place even in a daytime where infrared radiation does not reach, e.g., in an underground parking, etc. A light source which emits near infrared radiation can be used as the light source 8.

The control unit 5 has a detection unit 51 and a pinching prevention unit 52. The detection unit 51, which is one aspect of the detection means of the invention, detects a blocked state in which the detection line 6 captured by the camera 7 is at least partially blocked by a foreign object. The pinching prevention unit 52, which is one aspect of the pinching prevention means of the invention, causes the drive mechanism 4 to perform a pinch prevention operation for preventing pinching by the window glass 3 when the blocked state is detected by the detection unit 51 during when the window glass 3 is moved by the drive mechanism 4.

The detection unit 51 is provided with an image processing section 51a which processes an image captured by the camera 7 and extracts the detection line 6, and a blocked state determination section 51b which determines, based on the image processed by the image processing section 51a, whether or not it is the blocked state in which the detection line 6 is at least partially blocked by a foreign object.

A specific method of extracting the detection line 6 by the image processing section 51a is not specifically limited. For example, when an unnecessary portion is removed by trimming the image captured by the camera 7 and posterization process, binarization process or edge detection process is performed, the detection line 6 with brightness different from surrounding members can be extracted.

The blocked state determination section 51b is configured that, for example, an image in a non-blocked state (which is an image after being processed by the image processing section 51a) is preliminarily stored as an initial state image, and whether or not the detection line 6 is blocked by an foreign object is determined by comparing the initial state image to an image output from the image processing section 51a. The blocked state determination section 51b is configured to, e.g., compare the initial state image to an image output from the image processing section 51a and to determine it is the blocked state when a difference of the edge of the extracted detection line 6 or a difference of the area of the detection line 6 exceeds a preset foreign object determination threshold.

The pinching prevention unit 52 causes the drive mechanism 4 to perform a pinch prevention operation for preventing pinching by the window glass 3 when the blocked state is detected by the detection unit 51 during when the window glass 3 is moved by the drive mechanism 4. The pinch prevention operation includes an operation of stopping movement of the window glass 3, an operation of lowing the window glass 3 to a safe position, an operation of warning an operator by sound or light from an alarm device installed inside the vehicle, and a combination thereof.

The control unit 5 is further provided with a command cancellation unit 53 which cancels a command from the switch 24 when the blocked state is detected by the detection unit 51 after a command to move the window glass 3 is issued from the switch 24 but before the window glass 3 starts to move. Since the command cancellation unit 53 is provided, the window glass 3 does not move during when the blocked state is detected, and safety is thus further improved. The command cancellation unit 53 is one aspect of the command cancellation means of the invention.

Next, specific configurations, etc., of the camera 7 and the detection line 6 will be described.

Figure 2:
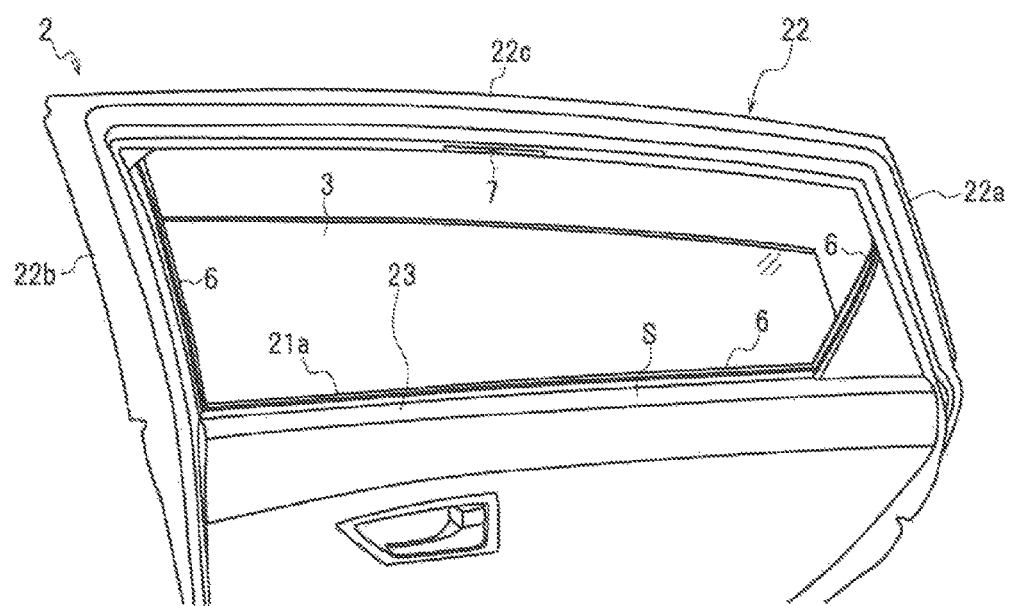
FIG. 2 is an explanatory diagram illustrating a door when viewed from the upper side inside a vehicle.
Figure 3:
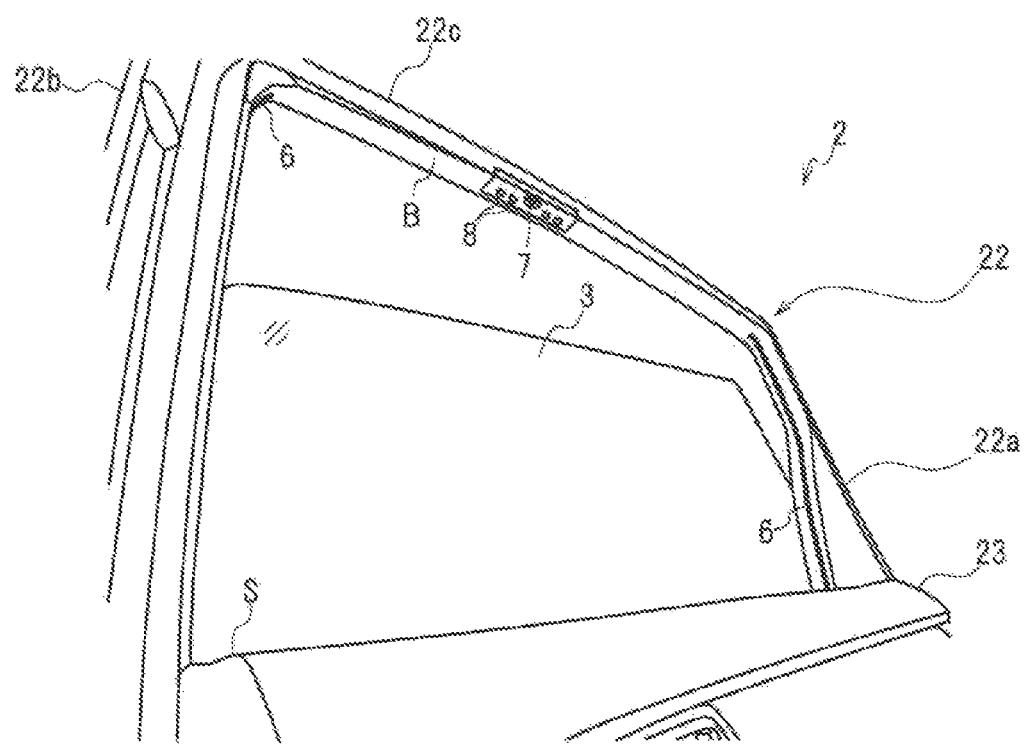
FIG. 3 is an explanatory diagram illustrating the door when viewed from the lower-front side of the vehicle.
Figure 4A:
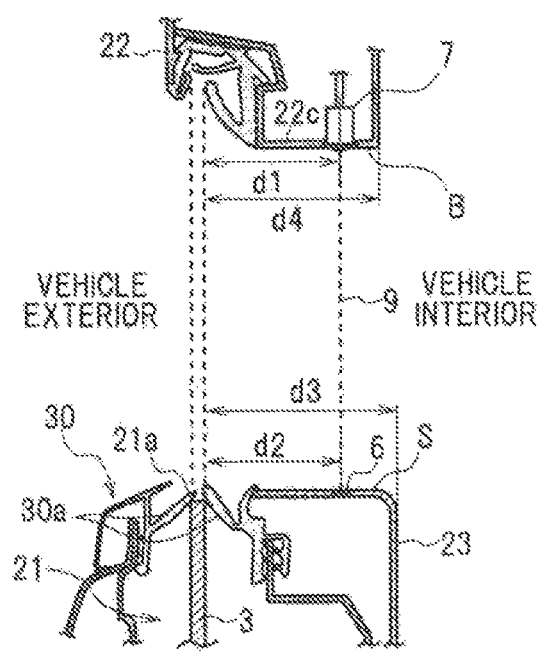
FIG. 4A is an explanatory diagram illustrating the positions and alignment of a camera and a detection line.
Figure 4B:
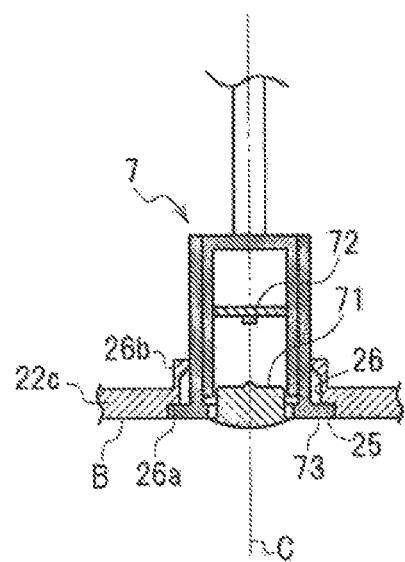
FIG. 4B is an enlarged view of FIG. 4A showing the portion provided with the camera.

FIG. 2 is an explanatory diagram illustrating the door 2 when viewed from the upper side inside a vehicle, FIG. 3 is an explanatory diagram illustrating the door 2 when viewed from the lower-front side of the vehicle, FIG. 4A is an explanatory diagram illustrating the positions and alignment of the camera 7 and a detection line 6, and FIG. 4B is an enlarged view of FIG. 4A showing the portion provided with the camera.

As shown in FIGS. 2 to 4B, in the vehicle window glass raising/lowering device 1 of the present embodiment, the camera 7 has an optical system 71 including at least one lens and an image pickup device 72 onto which a subject image is focused by the optical system 71, and the optical system 71 is arranged at a position corresponding to an opening 25 formed on an inner circumferential surface of the frame portion 22 so that an optical axis C of the optical system 71 passes through the opening 25.

In other words, in the present embodiment, the camera 7 is provided on the inner circumferential surface of the frame portion 22. The inner circumferential surface of the frame portion 22 here is a surface of the frame portion 22 facing the window glass 3 and is composed of a surface of the rear upright portion 22a on the front side of the vehicle, a surface of the front upright portion 22b on the rear side of the vehicle, and a surface of the upper extended portion 22c on the lower side. In other words, the inner circumferential surface of the frame portion 22 is a part of an outer surface of the frame portion 22 in the vicinity of the window glass 3.

The opening 25 is formed on the vehicle interior side with respect to the window glass 3, and the optical system 71 of the camera 7 is arranged so that the optical axis C is located on the vehicle interior side with respect to the windows glass 3.

Furthermore, the optical system 71 of the camera 7 is arranged above the door trim 23. In this configuration, the detection line 6 provided on the upper surface S of the door trim 23 can be captured by the camera 7. In the present embodiment, a hole 26 that becomes as the opening 25 and the camera 7 is attached in the hole 26. Although the camera 7 in this example is arranged so that the optical axis C of the optical system 71 coincides with the vertical direction when viewed in the cross section in FIG. 4A, the optical axis C of the optical system 71 may be inclined with respect to the vertical direction in the front-back direction of the vehicle or in the vehicle width direction, and can be appropriately adjusted according to the installed position or desired imaging range of the camera 7.

In the present embodiment, the camera 7 is arranged at the center of the lower surface B of the upper extended portion 22c in the front-back direction of the vehicle. However, the position of providing the camera 7 is not limited thereto and may be shifted toward the front or rear of the vehicle and can be set according to a shape of the window glass 3 etc.

The camera 7 has a columnar shape as a whole and has a flange 73 which is formed at a top end so as to protrude radially outward. The camera 7 is inserted into the hole 26 from below the upper extended portion 22c and is fixed to the door trim 23 by arranging the flange 73 so as to be housed in a recess 26a formed at a circumferential edge of the hole 26 and engaging a locking pawl 26b, which is provided at a lower circumferential edge of the hole 26, with a groove (not shown) provided on the camera 7. Although the top end face of the camera 7 is flush with the lower surface B of the upper extended portion 22c in this example, the top end face of the camera 7 may protrude downward from the lower surface B of the upper extended portion 22c or may be located above the lower surface B of the upper extended portion 22c. In addition, although the camera 7 in this example is arranged so that a portion of the optical system 71 is located below the opening 25, the camera 7 may be arranged so that the optical system 71 is located above the opening 25. In addition, the structure for fixing the camera 7 to the upper extended portion 22c and the direction to insert the camera 7 are not specifically limited and can be appropriately changed.

Figure 5:
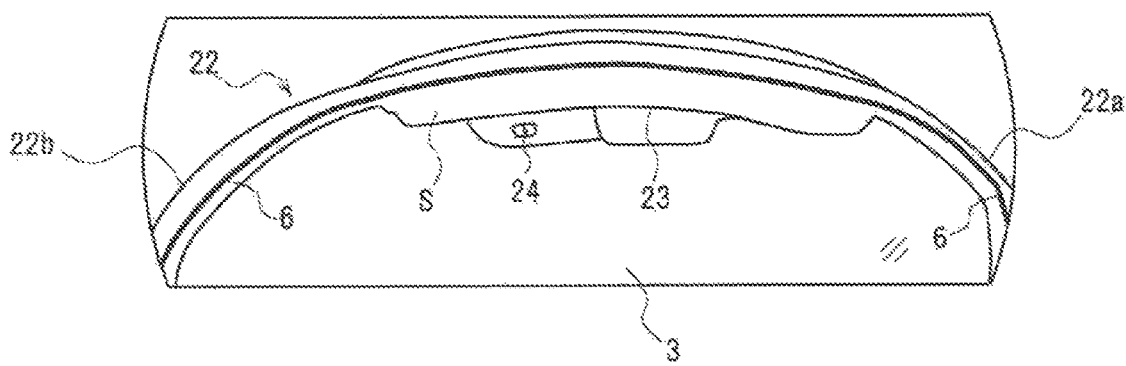
FIG. 5 is an explanatory diagram illustrating an example of an image captured by the camera after trimming.

The camera 7 is desirably configured so that the imaging range (a viewing angle) thereof covers the entire moving area of the window glass 3. In detail, the viewing angle of the camera 7 desirably covers the range from the vertically lower portion to the top end of the rear upright portion 22a on the rear side of the vehicle and from the vertically lower portion to the top end of the front upright portion 22b on the front end of the vehicle. An example of an image captured by the camera 7 (an image after trimming) is shown in FIG. 5.

It is desirable to use a wide-angle lens as the optical system 71 of the camera 7 so that a foreign object can be detected in the range described above. The optical system 71 used in this example is formed by combining plural ultra-wide angle lenses so as to have a viewing range of not less than 180°, or 190° taking into account the installation precision, in the front-back direction of the vehicle.

Meanwhile, to quickly detect the foreign object, the frame rate of the image pickup device 72 used is desirably as high as possible. In the present embodiment, a CMOS (Complementary MOS) image sensor is used as the image pickup device 72.

The detection line 6 is provided along the inner circumferential surfaces of the rear upright portion 22a and the front upright portion 22b, and the upper surface S of the door trim 23 on the vehicle interior side with respect to the window glass 3. In the present embodiment, the detection line 6 is continuously provided on the inner circumferential surfaces of all the rear upright portion 22a, the front upright portion 22b, and the upper surface S of the door trim 23 facing the window glass 3, on the vehicle interior side at a distance from the window glass 3.

The upper surface S of the door trim 23 here is an outer surface of the door trim 23 at a top edge portion and is a surface which is visible from above in a vertical direction. The upper surface S of the door trim 23 may be inclined with respect to the vehicle width direction (horizontal direction). The door trim 23 is generally curved such that the upper surface S has the highest portion in the vicinity of the window glass 3, i.e., in the vicinity of an exit slot 21a allowing the window glass 3 to come out from the storage portion 21, and slopes down as a distance from the window glass 3 increases. Thus, the upper surface S of the door trim 23 is an outer surface of the door trim 23 (a portion corresponding to a lower surface of the window frame) in the vicinity of the window glass 3 (the exit slot 21a).

In the present embodiment, although the detection line 6 is not provided on the upper extended portion 22c since the upper extended portion 22c is formed substantially flat, in case that, the upper extended portion 22c curves large, (e.g. in the case that the upper extended portion 22c curves downward from the rear side of the vehicle to the front side of the vehicle in a front door), the foreign object is desirably detected in the entire moving area of the window glass 3 by providing the detection line 6 on the inner circumferential surface of the upper extended portion 22c.

Figure 6:
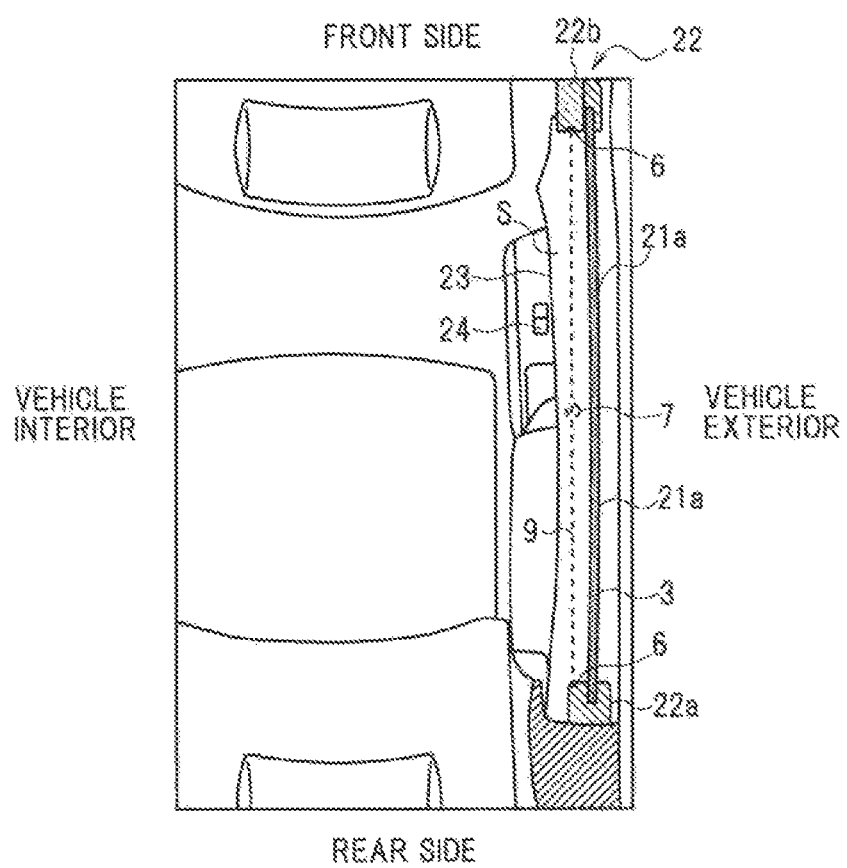
FIG. 6 is a top view illustrating a position of a detection surface.

A detection surface 9 described hereinafter is a plane formed by connecting points between the optical system 71 of the camera 7 and the detection line 6 at which the foreign object when located thereon causes the blocked state. As shown in FIGS. 4A, 4B, and 6, in the present embodiment, the detection surface 9 is arranged in a region surrounded by the upper surface of the door trim 23 and the inner circumferential surface of the frame portion 22. The detection surface 9 is substantially the same as a plane connecting the center of the optical system 71 (the center in the vehicle width direction, the height direction and the front-back direction of the vehicle) to the detection line 6, although depending on the specific configuration of the optical system 71.

The light source 8 is configured such that the entire detection line 6 is exposed to radiation. Although four light sources 8 are used in this example to emit infrared radiation onto the entire detection line 6, the number of the light sources 8 is not limited thereto. In addition, although the light sources 8 in this example are arranged on the upper extended portion 22c in the vicinity of the camera 7, the positions of the light sources 8 are not limited thereto. For example, the light sources 8 may be arranged on the upper surface S of the door trim 23, the inner circumferential surface of the rear upright portion 22a, and the inner surface of the front upright portion 22b.

A distance d1 in the vehicle width direction between the camera 7 and the window glass 3 (a distance in the vehicle width direction between an outer surface center of the optical system 71 and the window glass 3) and a distance d2 in the vehicle width direction between the detection line 6 and the window glass 3 are defined by taking into account safety and convenience. In detail, the detection line 6 is desirably provided on a position where pinching can be sufficiently prevented by taking into account the anticipated advancing speed of the foreign object, the frame rate of the camera 7, the operating speed of the control unit 5 (time that elapses from when the image is captured to when it is judged that the foreign object enters) and the speed that the drive mechanism 4 stops the movement of the window glass 3 (the time that elapses before the window glass 3 stops) in view of safety. The camera 7 and the detection line 6 are desirably arranged possibly in the vicinity of the window glass 3 in view of convenience since a part of the passenger's body may be located between the camera 7 and the detection line 6 depending on the position of the seat or the physical size of the passenger. The distances d1 and d2 should be defined in a region where a distance in which safety can be sufficient to be ensured and a distance in which fails to cause inconvenience lap over each other by taking into account these terms.

For example, given that the frame rate of the camera 7 is 400 fps (frame per second, 2.5 ms per frame), the time that elapses from when the image is captured to when it is judged that the foreign object enters is 10 ms (on the assumption that the brightness correction process, etc., requires up to 7.5 ms and the foreign object detection process requires 2.5 ms) and the time for stopping the window glass 3 is 20 ms, the window glass 3 is stopped 30 ms after the image is captured. In this case, given that the advancing speed of the foreign object is 1 m/s, the foreign object travels 30 mm in 30 ms. Therefore, sufficient safety can be ensured by stopping the window glass 3 before contact between a foreign object and the window glass 3 in the entire moving area of the window glass 3 by defining the distances d1, d2 not less than 30 mm (a distance in the vehicle width direction between the detection surface 9 and the window glass 3).

Meanwhile, the inventors actually verify to a plurality types of vehicles. The inventors confirm that sufficient convenience can be ensured by defining the distances d1, d2 within 25 to 30 mm. As an example, a result in verifying convenience between two type vehicles that are different in a distance d3 between the window glass 3 and an edge (an end face) of the door trim 23 on the vehicle interior side (see e.g. FIG. 4A), and a distance d4 between the window glass 3 and an edge (an end face) of the upper extended portion 22c on the vehicle interior side (see e.g. FIG. 4A) will be shown in Table 1. Furthermore, Table 1 also shows a result in verifying convenience by locating the camera 7 on the vehicle interior side with respect to the window frame (on the lower-front side of the vehicle with respect to the window glass 3) as a conventional example. In Table 1, the distance d1 in the vehicle width direction between the camera 7 and the window glass 3 according to the present invention is set to 30 mm and the distance in the vehicle width between the camera 7 and the window glass 3 according to the conventional example is set to 50 mm. Both distances d2 in the vehicle width direction between the detection line 6 and the window glass 3 according to the present invention and according to the conventional example are set to 30 mm.

TABLE 1

| | Vehicle 1 | | Vehicle 2 | |
| --- | --- | --- | --- | --- |
| | Distance d3 (mm) | | | |
| | 30 to 40 | | 35 to 50 | |
| | Distance d4 (mm) | | | |
| | 35 | | 40 | |
| | Present invention | Conventional example | Present invention | Conventional example |
| Distance between the camera and the window glass | 30 | 50 | 30 | 50 |
| Existence of a foreign object detection when the passenger sits (the sheet position located at the rear side) | NO | NO | NO | NO |
| Existence of a foreign object detection when the passenger sits (the sheet position located at the front side) | NO | YES | NO | YES |

As shown in Table 1, according to the present invention in which the distance d1 in the vehicle width direction between the camera 7 and the window glass 3 is set to 30 mm, the foreign object is not detected during the passenger exists (sits) without reference to the position of the sheet. Meanwhile, according to the conventional example, when the position of the sheet is in the front side, the part of the passenger's body is located between the camera 7 and the detection line 6 depending on the physical size of the passenger during the passenger exists (sits), and this causes a result that the foreign object is detected even though there is actually no possibility of getting pinched by the window glass 3. As the inventors further verify, the inventors confirm that sufficient convenience can be ensured by setting the distances d1, d2 within 25 to 30 mm for the vehicle whose width of the upper surface S of the door trim 23 is approximately 40 mm (e.g., within 30 to 50 mm).

From above result, in view of safety, the distances d1, d2 are desirably not less than 30 mm, and in view of convenience, the distances d1, d2 are desirably within 25 to 30 mm. Therefore, in such case, the distances d1, d2 are desirably 30 mm.

The advancing speed of the foreign object is 1 m/s in the above verify in safety, but may be estimated to be 0.5 m/s in view of preventing, e.g., a part of elderly person's body, etc., from being pinched, and the window glass 3 can be stopped before contact between a foreign object and the window glass 3 by setting the distances d1 and d2 not less than 14.5 mm. In addition, even when the frame rate of the camera 7 in such case is increased to 1000 fps (1 ms per frame), the window glass 3 can be stopped before contact between a foreign object and the window glass 3 by setting the distances d1 and d2 not less than 24 mm. Furthermore, sufficient convenience may be ensured even though the distances d1 and d2 are not less than 30 mm depending on the width of the door trim 23 and the size of the vehicle interior of an applied vehicle. Therefore, the distances d1 and d2 can be suitably set with respect to desired safety or an ability of using member such as the camera 7 and the drive unit 4.

Meanwhile, the distance d2 between the detection line 6 and the window glass 3 does not need to be constant.

The detection line 6 is formed so that brightness under infrared radiation is different from surrounding members. For example, when a metal (sheet metal) constituting the door 2 and a rubber member (waist) on the vehicle body are adjacent to each other in the state that the door 2 is closed, a boundary therebetween (i.e., a boundary between the door 2 and the vehicle body) can be used as the detection line 6. Meanwhile, when the inner surface of the frame portion 22 is formed of a resin, a line formed by providing a recess on a portion of the resin so as to have a different infrared reflectance from the surroundings can be used as the detection line 6. However, it is not limited thereto. The detection line 6 may be formed by applying a highly infrared reflective paint to the inner surface of the frame portion 22, or may be an existing member of which brightness under infrared radiation is different from surroundings.

In the present embodiment, the pinch prevention operation is also performed when the blocked state is detected during when the window glass 3 is moving down. This is to prevent a part of human body such as finger from being dragged into the exit slot 21a during when the window glass 3 is moving down. A weather strip 30 having a lip seal 30a slidably in contact with the window glass 3 is provided around the exit slot 21a to prevent ingress of water, etc., into the storage portion 21 (an internal space of the door 2). When the window glass 3 is lowered, clothing or a part of human body such as finger may be dragged, together with the lip seal 30a, into the storage portion 21. In the present embodiment, it is possible to prevent such dragging and thereby to further improve safety. Here, an operation of moving down the window glass 3 is not included in the pinch prevention operation which is performed when the blocked state is detected during when the window glass 3 is moving down.

Next, a control flow of the vehicle window glass raising/lowering device 1 will be described.

As shown in FIG. 7, the vehicle window glass raising/lowering device 1 is configured such that the control unit 5 firstly judges whether or not a signal is input from the switch 24 at Step S1. If judged as NO at Step S1, the control unit 5 controls the camera 7 to be turned off (or kept in the off-state) at Step S2 and the flow is allowed to return to Step S1. If the light sources 8 are turned on at this stage, the light sources 8 are also turned off at Step S2, though it is not shown in the drawing.

If judged as YES at Step S1, the control unit 5 controls the camera 7 to be turned on (or kept in the on-state) at Step S3 and the flow is allowed to proceed to Step S4. If the illumination intensity to capture an image by the camera 7 is not enough, the light sources 8 are turned on at Step S3, though it is not shown in the drawing.

At Step S4, the detection unit 51 (i.e., the image processing section 51a and the blocked state determination section 51b) performs a processing of detecting the blocked state (i.e., a blocked state detection processing) based on the image captured by the camera 7. After that, at Step S5, the command cancellation unit 53 judges whether or not the blocked state is detected by the detection unit 51.

If judged as YES at Step S5, the command cancellation unit 53 determines that there is a risk of being pinched by the window glass 3 and the flow is allowed to return to Step S1 without moving the window glass 3 (i.e., the signal from the switch 24 is cancelled).

If judged as NO at Step S5, the control unit 5 judges whether or not the signal input from the switch 24 is a first-level click signal (a first-level move-down click signal or a first-level move-up click signal) at Step S6.

If judged as YES at Step S6, the control unit 5 instructs the drive mechanism 4 to control the movement of the window glass 3 at Step S7.

After that, at Step S8, the detection unit 51 performs a processing of detecting the blocked state (i.e., a blocked state detection processing) based on the image captured by the camera 7. After that, at Step S9, the pinching prevention unit 52 judges whether or not the blocked state is detected by the detection unit 51.

If judged as YES at Step S9, there is a risk of being pinched by the window glass 3. Accordingly, the pinching prevention unit 52 performs a pinch prevention operation such as halting the movement of the window glass 3 or lowering the window glass 3 to the safe position at Step S10. After that, the control unit 5 terminates the movement of the window glass 3 at Step S18 and the flow is allowed to return to Step S2. As describe above, in the present embodiment, if the blocked state is detected while the first-level click signal is being input from the switch 24, the movement of the window glass 3 is terminated after performing the pinch prevention operation.

If judged as NO at Step S9, there is no risk of being pinched by the window glass 3. Accordingly, the control unit 5 judges whether or not a signal is input from the switch 24 at Step S11. If judged as NO at Step S11, this means that an operation on the switch 24 is finished. Accordingly, the control unit 5 terminates the movement of the window glass 3 at Step S18 and the flow is allowed to return to Step S2. If judged as YES at Step S11, the flow is allowed to return to Step S6 and the window glass 3 is kept moving.

On the other hand, if judged as NO at Step S6, i.e., if a second-level click signal (a second-level move-down click signal or a second-level move-up click signal) is input from the switch 24, the control unit 5 instructs the drive mechanism 4 to control the movement of the window glass 3 at Step S12.

After that, at Step S13, the detection unit 51 performs a processing of detecting the blocked state (i.e., a blocked state detection processing) based on the image captured by the camera 7. After that, at Step 14, the pinching prevention unit 52 judges whether or not the blocked state is detected by the detection unit 51.

If judged as YES at Step S14, there is a risk of being pinched by the window glass 3. Accordingly, the pinching prevention unit 52 performs a pinch prevention operation at Step S15. After that, the movement of the window glass 3 is terminated at Step S18 and the flow is allowed to return to Step S2. In other words, in the present embodiment, if the second-level click signal is input from the switch 24 and the blocked state is detected during when the window glass 3 is moving, the movement of the window glass 3 is terminated after performing the pinch prevention operation.

If judged as NO at Step S14, there is no risk of being pinched by the window glass 3. Accordingly, the control unit 5 judges whether or not the window glass 3 is moved to an edge (to the top or bottom end) at Step S16. If judge as YES at Step S16, the control unit 5 terminates the movement of the window glass 3 at Step S18 and the flow is allowed to return to Step S2. Meanwhile, the positional information of the window glass 3 may be obtained by using a rotational pulse generated by a Hall IC incorporated in the motor 41, or using current ripple.

If judged as at Step S16, it is judged whether or not a new signal is input from the switch 24 (i.e., whether or not a new signal is input after the second-level click signal is input) at Step S17. If judged as YES at Step S17, the flow is allowed to return to Step S6. If judged as NO at Step S17, the flow is allowed to return to Step S12 and the window glass 3 is kept moving. That is, if the second-level click signal is input, the window glass 3 is kept moving until the blocked state is detected, the window glass 3 is moved to an edge or a new signal is input from the switch 24.

Functions and Effects of the Embodiment

As described above, the vehicle window glass raising/lowering device 1 in the present embodiment is provided with the camera 7 which captures the image of the detection line 6 that is provided on the vehicle interior side with respect to the window glass 3 and is at least partially along the frame portion 22, and the optical system 71 is arranged at a position corresponding to the opening 25 formed on the inner circumferential surface of the frame portion 22 that is attached on the vehicle interior side of the storage portion 21 so that the optical axis C of the optical system 71 passes through the opening 25.

In this configuration, since the camera 7 can be arranged close to the window glass 3 and the detection area of the foreign object is set close to the window glass 3, it is possible to prevent such a problem that the pinch prevention operation is performed despite no risk of getting pinched by the window glass 3, hence, convenience can be improved while safety is ensured. Furthermore, the entire moving area of the window glass 3 can be the detection range by monitoring the detection line 6 located on the frame portion 22.

In addition, dust is hard to stick on the optical system 71 of the camera 7 and incorrectly detecting caused by pollution on the optical system 71 can be prevented since the camera 7 is arranged at the frame portion 22 (the upper extended portion 22c) in the present embodiment.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A vehicle window glass raising/lowering device (1), comprising: a drive mechanism (4) arranged on a vehicle door (2) comprising a storage portion (21) for housing a window glass (3) and a frame portion (22) provided above the storage portion (21) to vertically move a window glass (3) relative to the frame portion (22); a control unit (5) for controlling the drive mechanism (4); and a camera (7) for capturing an image of a detection line (6) provided on the vehicle interior side with respect to the window glass (3), the detection line (6) being along at least a portion of the frame portion (22) and an upper surface (S) of a door trim (23) attached on a vehicle interior side of the storage portion (21), wherein the camera (7) comprises an optical system (71) including at least one lens and an image pickup device (72) onto which a subject image is focused by the optical system (71), the control unit (5) comprises a detection means (51) for detecting a blocked state in which the detection line (6) captured in an image by the camera (7) is at least partially blocked by a foreign object, and a pinching prevention means (52) that causes the drive mechanism (4) to perform a pinch prevention operation for preventing pinching by the window glass (3) when the blocked state is detected by the detection means (51) during when the window glass (3) is moved by the drive mechanism (4), and the optical system (71) is arranged at a position corresponding to an opening (25) formed on an inner circumferential surface of the frame portion (22) so that an optical axis (C) of the optical system (71) passes through the opening (25).

[2] The vehicle window glass raising/lowering device (1) defined by [1], wherein the optical system of (71) the camera (7) is arranged above the door trim (23).

[3] The vehicle window glass raising/lowering device (1) defined by [2], wherein the frame portion (22) comprises a rear upright portion (22a) extending upwards from an end of the storage portion (21) on the rear side in a front-back direction of the vehicle, a front upright portion (22b) extending upwards from the storage portion (21) on a front side with respect to the rear upright portion (22a), and an upper extended portion (22c) extending from a top end of the rear upright portion (22a) to a top end of the front upright portion (22b), and the optical system (71) is arranged at a position corresponding to the opening (25) formed on an inner circumferential surface of the upper extended portion (22c) so that the optical axis (C) of the optical system (71) passes through the opening (25).

[4] The vehicle window glass raising/lowering device (1) defined by any one of [1] to [3], further comprising a light source (8) that emit infrared radiation toward the detection line (6), wherein the camera (7) comprises an infrared camera that captures the infrared radiation emitted from the light source (8) and reflected by the detection line (6).

[5] The vehicle window glass raising/lowering device (1) defined by any one of [1] to [4], wherein the control unit (5) further comprises a command cancellation means (53) that cancels a command for moving the window glass (3) when the blocked state is detected by the detection means (51) after issuing the command and before starting movement of the window glass (3).

[6] A vehicle door (2), comprising: a storage portion (21) for housing a window glass (3); a frame portion (22) provided above the storage portion (21); a drive mechanism (4) that vertically moves the window glass (3) relative to the frame portion (22); a control unit (5) for controlling the drive mechanism (4); and a camera (7) for capturing an image of a detection line (6) provided on the vehicle interior side with respect to the window glass (3), the detection line (6) being along at least a portion of the frame portion (22) and an upper surface (S) of a door trim (23) attached on a vehicle interior side of the storage portion (21), wherein the camera (7) comprises an optical system (71) including at least one lens and an image pickup device (72) onto which a subject image is focused by the optical system (71), the control unit (5) comprises a detection means (51) for detecting a blocked state in which the detection line (6) captured in an image by the camera (7) is at least partially blocked by a foreign object, and a pinching prevention means (52) that causes the drive mechanism (4) to perform a pinch prevention operation for preventing pinching by the window glass (3) when the blocked state is detected by the detection means (51) during when the window glass (3) is moved by the drive mechanism (4), and the optical system (71) is arranged at a position corresponding to the opening (25) formed on an inner circumferential surface of the frame portion (22) so that an optical axis of the optical system (71) passes through the opening (25).

[7] The vehicle door (2) defined by [6], wherein the opening (25) is formed above the door trim (23).

[8] The vehicle door (2) defined by [7], wherein the frame portion (22) comprises a rear upright portion (22a) extending upwards from an end of the storage portion (21) on the rear side in a front-back direction of the vehicle, a front upright portion (22b) extending upwards from the storage portion (21) on a front side with respect to the rear upright portion (22a), and an upper extended portion (22c) extending from a top end of the rear upright portion (22a) to a top end of the front upright portion (22b), and the optical system (71) is arranged at a position corresponding to the opening (25) formed on an inner circumferential surface of the upper extending portion (22c) so that an optical axis (C) of the optical system (71) passes through the opening (25).

[9] The vehicle door (2) defined by any one of [6] to [8], wherein further comprising a light source (8) that emit infrared radiation toward detection line (6), wherein the camera (7) comprises an infrared camera that captures the infrared radiation emitted from the light source (8) and reflected by the detection line (6).

[10] The vehicle door (2) defined by any one of [6] to [9], wherein the control unit (5) further comprises a command cancellation means (53) that cancels a command for moving the window glass (3) when the blocked state is detected by the detection means (51) after issuing the command and before starting movement of the window glass (3).

[11] A vehicle, comprising the vehicle door (2) defined by any one of [6] to [10].

Although the embodiment of the invention has been described, the invention according to claims is not to be limited to the above-mentioned embodiment. Further, please note that all combinations of the features described in the embodiment are not necessary to solve the problem of the invention.

The invention can be appropriately modified and implemented without departing from the gist thereof. For example, although it is not mentioned in the embodiment, the vehicle window glass raising/lowering device 1 may be provided with a safety device which monitors the rotational speed of the motor 41, determines that a foreign object is pinched by the window glass when the rotational speed of the motor 41 is reduced, and performs various safety operations such as automatic lowering of the window glass 3 by reversing its movement direction.

In addition, although the invention is applied to a rear door 2 of vehicle in the embodiment, it is not limited thereto. The invention is also applicable to front doors of vehicle.

INDUSTRIAL APPLICABILITY

The invention is applicable to a vehicle window glass raising/lowering device which is provided with a mechanism to prevent pinching by an automatically raising window glass.

REFERENCE SIGNS LIST

1 VEHICLE WINDOW GLASS RAISING/LOWERING DEVICE
2 DOOR (VEHICLE DOOR)
3 WINDOW GLASS
4 DRIVE MECHANISM
5 CONTROL UNIT
6 DETECTION LINE
7 CAMERA
21 STORAGE PORTION
22 FRAME PORTION
23 DOOR TRIM
25 OPENING
51 DETECTION UNIT (DETECTION MEANS)
52 PINCHING PREVENTION UNIT (PINCHING PREVENTION MEANS)

The invention claimed is:

1. A vehicle window glass moving device, comprising:
a drive mechanism arranged on a vehicle door, the vehicle door comprising a storage portion for housing a window glass and a frame portion provided above the storage portion, the drive mechanism configured to vertically move the window glass relative to the frame portion;
a control unit for controlling the drive mechanism; and
a camera for capturing an image of a detection line provided on a vehicle interior side with respect to the window glass, the detection line being along at least a portion of the frame portion and an upper surface of a door trim attached on a vehicle interior side of the storage portion,
wherein the camera comprises an optical system comprising at least one lens and an image pickup device onto which a subject image is focused by the optical system wherein a portion of the optical system is arranged above the door trim,
wherein the control unit comprises a detection means for detecting a blocked state in which the detection line captured in an image by the camera is at least partially blocked by a foreign object, and a pinching prevention means that causes the drive mechanism to perform a pinch prevention operation for preventing pinching by the window glass when the blocked state is detected by the detection means during when the window glass is moved by the drive mechanism,
wherein the camera is attached to an edge of a hole within the frame portion, and
wherein a portion of the optical system protrudes from an opening formed on an inner circumferential surface of the frame portion toward the door trim.

2. The vehicle window glass moving device according to claim 1, wherein the frame portion comprises a rear upright portion extending upwards from an end of the storage portion on the rear side in a front-back direction of the vehicle, a front upright portion extending upwards from the storage portion on a front side with respect to the rear upright portion, and an upper extended portion extending from a top end of the rear upright portion to a top end of the front upright portion, and
wherein the optical system is arranged in an inner circumferential surface of the upper extended portion so that the portion of the optical system is located below the opening formed on the inner circumferential surface of the upper extended portion.

3. The vehicle window moving device according to claim 2, wherein the camera is configured to capture the detection line, the detection line provided continuously from an inner circumferential surface of the rear upright portion, the upper surface of the door trim and an inner circumferential surface of the front upright portion.

4. The vehicle window glass moving device according to claim 1, further comprising a light source that emits infrared radiation toward the detection line,
wherein the camera is an infrared camera that captures the infrared radiation emitted from the light source and reflected by the detection line.

5. The vehicle window glass moving device according to claim 1, wherein the control unit further comprises a command cancellation means that cancels a command for moving the window glass when the blocked state is detected by the detection means after issuing the command and before starting movement of the window glass.

6. A vehicle door, comprising:
a storage portion for housing a window glass;
a frame portion provided above the storage portion;
a drive mechanism that vertically moves the window glass relative to the frame portion;
a control unit for controlling the drive mechanism; and
a camera for capturing an image of a detection line provided on an interior of a vehicle, the detection line being along at least a portion of the frame portion and an upper surface of a door trim attached on a vehicle interior side of the storage portion,
wherein the camera comprises an optical system comprising at least one lens and an image pickup device onto which a subject image is focused by the optical system wherein a portion of the optical system is arranged above the door trim,
wherein the control unit comprises a detection means for detecting a blocked state in which the detection line captured in an image by the camera is at least partially blocked by a foreign object, and a pinching prevention means that causes the drive mechanism to perform a pinch prevention operation for preventing pinching by the window glass when the blocked state is detected by the detection means during when the window glass is moved by the drive mechanism,
wherein the camera is attached to an edge of a hole within the frame portion, and
wherein a portion of the optical system protrudes from an opening formed on an inner circumferential surface of the frame portion toward the door trim.

7. The vehicle door according to claim 6, wherein the frame portion comprises a rear upright portion extending upwards from an end of the storage portion on the rear side in a front-back direction of the vehicle, a front upright portion extending upwards from the storage portion on a front side with respect to the rear upright portion, and an upper extended portion extending from a top end of the rear upright portion to a top end of the front upright portion, and
wherein the optical system is arranged in an inner circumferential surface of the upper extended portion so that the portion of the optical system is located below the opening formed on the inner circumferential surface of the upper extended portion.

8. The vehicle door according to claim 7, wherein the camera is configured to capture the detection line, the detection line provided continuously from an inner circumferential surface of the rear upright portion, the upper surface of the door trim and an inner circumferential surface of the front upright portion.

9. The vehicle door according to claim 6, further comprising a light source that emit infrared radiation toward the detection line,
wherein the camera is an infrared camera that captures the infrared radiation emitted from the light sources and reflected by the detection line.

10. The vehicle door according to claim 6, wherein the control unit further comprises a command cancellation means that cancels a command for moving the window glass when the blocked state is detected by the detection means after issuing the command and before starting movement of the window glass.

11. A vehicle, comprising the vehicle door according to claim 6.

* * * * *